United States Patent
Venkata

(10) Patent No.: US 10,552,122 B2
(45) Date of Patent: Feb. 4, 2020

(54) SYSTEMS AND METHODS FOR CUSTOMIZABLE REGULAR EXPRESSION GENERATION

(71) Applicant: MasterCard International Incorporated, Purchase, NY (US)

(72) Inventor: Ravi Teja Prabhala Venkata, Richmond Heights, MO (US)

(73) Assignee: Mastercard International Incorporated, Purchase, NY (US)

(*) Notice: Subject to any disclaimer, the term of this patent is extended or adjusted under 35 U.S.C. 154(b) by 0 days.

(21) Appl. No.: 15/584,977

(22) Filed: May 2, 2017

(65) Prior Publication Data

US 2018/0321921 A1 Nov. 8, 2018

(51) Int. Cl.
*G06F 8/33* (2018.01)
*G06F 8/34* (2018.01)
(Continued)

(52) U.S. Cl.
CPC ............... *G06F 8/33* (2013.01); *G06F 8/34* (2013.01); *G06F 16/332* (2019.01); *G06F 11/3604* (2013.01)

(58) Field of Classification Search
CPC ............ G06F 17/20–21; G06F 17/22; G06F 17/2217; G06F 17/27; G06F 17/2705; G06F 17/2725; G06F 17/28; G06F 17/30; G06F 17/30023; G06F 17/30038; G06F 8/30; G06F 8/33; G06F 8/34; G06F 3/0482; G06F 3/04842; G06F 3/04847;
(Continued)

(56) References Cited

U.S. PATENT DOCUMENTS 6,665,679 B2 * 12/2003 Curtis .................... G06Q 40/00
7,136,947 B1    11/2006 Passerone et al.
(Continued)

OTHER PUBLICATIONS

Scholten, C., "Regular Expression Tester", Code Project [online], 2005 [retrieved Feb. 1, 2018], Retrieved from Internet: <URL: https://www.codeproject.com/Articles/11574/Regular-Expression-Tester>, pp. 1-8.*

(Continued)

*Primary Examiner* — Todd Aguilera
(74) *Attorney, Agent, or Firm* — Armstrong Teasdale LLP

(57) ABSTRACT

A regular expression generator (REG) computing device for generating customized regular expressions readable by a computing device is provided. The REG computing device is configured to receive an input string including a plurality of characters for use in generating a regular expression. The REG computing device is also configured to generate character patterns for at least one character of the plurality of characters. The REG computing device is further configured to display, for the at least one character, the character patterns. The REG computing device is also configured to assign, based on input received via a user interface, a first character pattern of the character patterns to the at least one character. The REG computing device is further configured to generate the regular expression using the first character pattern. The REG computing device is also configured to display the regular expression on the user interface.

17 Claims, 5 Drawing Sheets

(51) Int. Cl.
*G06F 16/332* (2019.01)
*G06F 11/36* (2006.01)

(58) Field of Classification Search
CPC ........ G06F 11/36–3616; G06F 11/3664–3696;
G06F 17/30637; G06F 16/00; G06F
16/144; G06F 16/24–24549; G06F
16/2458; G06F 16/33–3338; G06F
16/83–8373; G06F 16/903–90348
USPC .................................................. 717/124–135
See application file for complete search history.

(56) References Cited

U.S. PATENT DOCUMENTS

| | | | |
|---|---|---|---|
| 7,729,694 | B2 | 6/2010 | Bolt et al. |
| 7,987,504 | B2 | 7/2011 | Stone et al. |
| 8,165,157 | B1 | 4/2012 | Taubert et al. |
| 8,261,241 | B2 * | 9/2012 | Gutierrez ................. G06F 8/70 707/759 |
| 8,908,666 | B2 | 12/2014 | Nixon et al. |
| 8,953,566 | B2 | 2/2015 | Hegde et al. |
| 8,990,406 | B2 | 3/2015 | Doss et al. |
| 9,208,168 | B2 | 12/2015 | Knight et al. |
| 9,317,499 | B2 * | 4/2016 | Bostick ................. G06F 17/278 |
| 9,390,117 | B2 * | 7/2016 | Iwama ................ G06F 17/2705 |
| 9,485,231 | B1 | 11/2016 | Reese |
| 2001/0021922 | A1 * | 9/2001 | Curtis .................... G06Q 40/00 705/35 |
| 2005/0002417 | A1 | 1/2005 | Kelly et al. |
| 2006/0167873 | A1 * | 7/2006 | Degenaro ........... G06F 9/45512 |
| 2009/0282391 | A1 * | 11/2009 | Gutierrez ................. G06F 8/10 717/128 |
| 2010/0302163 | A1 * | 12/2010 | Ghassabian ........... G06F 3/0237 345/168 |
| 2013/0339377 | A1 * | 12/2013 | Iwama ................ G06F 17/2705 707/758 |
| 2014/0309985 | A1 * | 10/2014 | Bostick ............. G06F 17/30864 704/9 |
| 2014/0359144 | A1 | 12/2014 | Kruse et al. |
| 2015/0264626 | A1 | 9/2015 | Perdomo |
| 2015/0278137 | A1 | 10/2015 | Gan et al. |
| 2015/0381737 | A1 | 12/2015 | Quinn et al. |
| 2016/0323435 | A1 | 11/2016 | Antonopoulos et al. |

OTHER PUBLICATIONS

Goyvaerts, J., RegexMagic User's Guide, Just Great Software Co., Ltd. [online], 2016 [retrieved Feb. 2, 2018], Retrieved from Internet: <URL: https://web.archive.org/web/20161203190402/http://www.regexmagic.com/manual/RegexMagic.pdf>, whole document.*

Machine translation of Cardenas, T., "txt2re, deja de pegarte con las regex", generated Sep. 5, 2018, pp. 1-6.*

Cardenas, T., "txt2re, deja de pegarte con las regex", genbeta [online], 2011 [retrieved Sep. 6, 2018], Retrieved from Internet: <URL: https://www.genbeta.com/desarrollo/txt2re-deja-de-pegarte-con-las-regex>, pp. 1-6.*

Screen captures from Mar. 2, 2011 version of txt2re.com generated Sep. 5, 2018, Generated from Internet: <URL: https://web.archive.org/web/20110302095159/https://txt2re.conn/>, pp. 1-6.*

Screen captures from Mar. 2, 2011 version of txt2re.com generated Dec. 11, 2018, Generated from Internet: <URL: https://web.archive.org/web/20110302095159/https://txt2re.com/>, pp. 1-6.*

* cited by examiner

SYSTEMS AND METHODS FOR CUSTOMIZABLE REGULAR EXPRESSION GENERATION

BACKGROUND

This disclosure relates to generating customizable regular expressions that are usable to facilitate computer software development. More specifically, the disclosure relates to a regular expression generator that enables a user to enter granular preferences to tailor the resulting regular expression.

Many computer programming languages support use of regular expressions because regular expressions provide significant advantages in the creation and use of computer applications. For example, a computer application may require that application inputs must adhere to a specific format or pattern. This pattern can be encoded in a regular expression in order to save time, space, and effort that would otherwise be used in order to store every possible input and output matching the desired pattern. For example, a regular expression [a-zA-Z] can encode a character pattern for the alphabet (lowercase and uppercase), so that typing out the entire alphabet is not required. Additionally, regular expressions can be used to define a search pattern (e.g., where a specific pattern is being searched for, rather than a single string). For example, the regular expression [a-zA-Z], if used as a search pattern, would return all alphabetical characters (not numbers, spaces, or special characters) from a targeted text block.

Generating the desired regular expression can be subject to certain challenges. For example, as described above, a regular expression may be used to define an application input. But for this purpose, an application programmer may need to analyze and test multiple application inputs before arriving at the regular expression that patterns all the analyzed inputs. This may require testing candidate regular expressions within application code, which requires a significant amount of computing time and programmer time. Even then, this may not guarantee that the regular expression represents all possible inputs for the application. It can be tedious and time-consuming to write additional code just to test the regular expression. Additionally, where an application must adhere to more than one coding platform or programming language, the regular expression may fail to satisfy grammar requirements for each programming language.

Moreover, individuals that are unfamiliar with computer science or computer programming may be required to generate regular expressions as part of their work. These individuals may be unable to generate regular expressions without significant coaching by computer programmers, leading to further time and effort being expended. In many cases, business users may have business rules for creating patterned text (e.g., usernames that must start with a first letter of the first name plus the last name) but no ability to convert those business rules into usable application inputs using regular expressions.

Some known regular expression systems suffer from particular drawbacks. Some known systems are able to generate regular expressions for one platform or language only. These known systems provide no ability to customize or tailor the regular expression based on user preferences. Additionally, some known systems provide the ability to type a regular expression and then test it, but not the ability to enter an input string and receive a generated regular expression. Accordingly, there is a need for more effective techniques for generating regular expressions to create application inputs for a variety of computer applications.

BRIEF DESCRIPTION

In one aspect, a regular expression generator (REG) computing device for generating customized regular expressions readable by a computing device is provided. The REG computing device includes a processor and a memory device. The REG computing device is configured to receive an input string including a plurality of characters for use in generating a regular expression. The REG computing device is also configured to generate one or more character patterns for at least one character of the plurality of characters. The REG computing device is further configured to display, for the at least one character, the one or more character patterns. The REG computing device is also configured to assign, based on an input received via a user interface, a first character pattern of the one or more character patterns to the at least one character. The REG computing device is further configured to generate the regular expression using the first character pattern. The REG computing device is also configured to display the regular expression on the user interface.

In another aspect, a computer-implemented method for generating customized regular expressions readable by a computing device is provided. The method implemented is using a regular expression generator (REG) computing device including a processor and a memory device. The method includes receiving, by the REG computing device, an input string including a plurality of characters for use in generating a regular expression. The method also includes generating one or more character patterns for at least one character of the plurality of characters. The method further includes displaying, for the at least one character, the one or more character patterns. The method also includes assigning, based on an input received via a user interface, a first character pattern of the one or more character patterns to the at least one character. The method further includes generating the regular expression using the first character pattern. The method also includes displaying the regular expression on the user interface.

In yet another aspect, a non-transitory computer readable medium that includes computer executable instructions for generating customized regular expressions readable by a computing device is provided. When executed by a regular expression generator (REG) computing device including a processor and a memory device, the computer executable instructions cause the REG computing device to receive an input string including a plurality of characters for use in generating a regular expression. The computer executable instructions also cause the REG computing device to generate one or more character patterns for at least one character of the plurality of characters. The computer executable instructions further cause the REG computing device to display, for the at least one character, the one or more character patterns. The computer executable instructions also cause the REG computing device to assign, based on an input received via a user interface, a first character pattern of the one or more character patterns to the at least one character. The computer executable instructions further cause the REG computing device to generate the regular expression using the first character pattern. The computer executable instructions also cause the REG computing device to display the regular expression on the user interface.

BRIEF DESCRIPTION OF THE DRAWINGS

FIG. 1 illustrates an example configuration of a regular expression generator (REG) computing device configured to generate customizable regular expressions.

FIG. 2 shows an example user interface screen which the REG computing device uses to receive inputs for generating regular expressions.

FIG. 3 shows an example user interface screen which the REG computing device uses to prompt the user to test generated regular expressions.

FIG. 4 shows an example method flow illustrating how the REG computing device generates customizable regular expressions.

FIG. 5 shows an example configuration of a database within a computer device, along with other related computer components, that may be used to generate customizable regular expressions.

Like numbers in the Figures indicate the same or functionally similar components.

DETAILED DESCRIPTION

Figure 1:
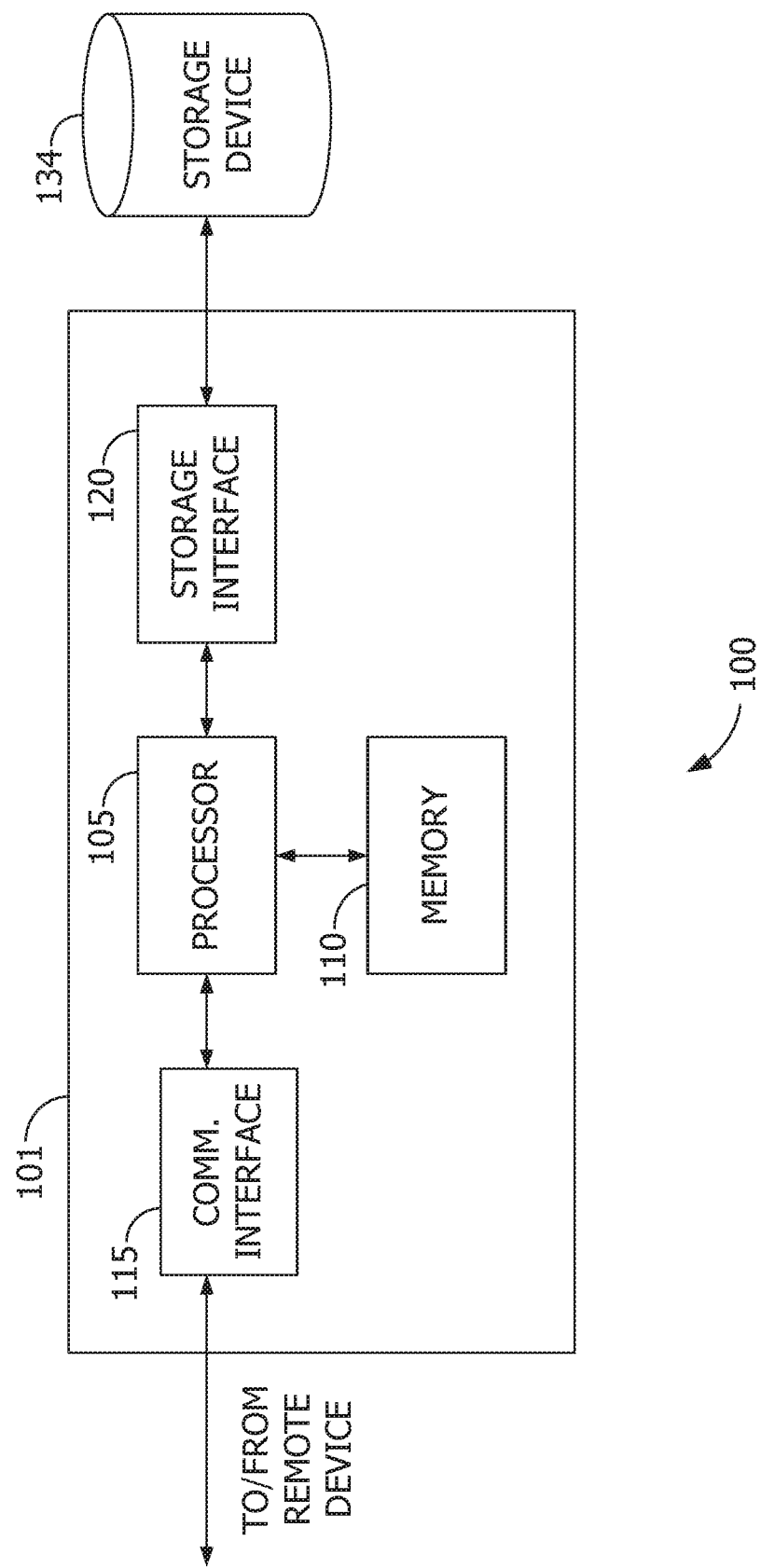
FIGS. 1-5 show example embodiments of the methods and systems described herein.

Systems and methods described herein relate generally to generating regular expressions from input strings using a regular expression generator (REG) computing device. In at least some implementations, the REG computing device is communicatively coupled to a user computing device that is configured to display a user interface (e.g., a web site or computer application). The REG computing device is configured to generate regular expressions using one or more input strings that serve as the template for the regular expressions. During the generation process, the REG computing device is also configured to receive one or more preference inputs (e.g., relating to length and type of the regular expression), and customize the generated regular expression according to the preference inputs. The REG computing device is also configured to provide additional functions such as storing, copying, and exporting the regular expressions.

In at least some implementations, the REG computing device includes a processor and a memory device. The REG computing device is configured to receive an input string via a user interface. In one embodiment, the user interface is a web site, a web page, or an online portal that can be accessed via a browser. In another embodiment, the user interface includes a computer application (e.g., a desktop application or mobile device application) that is installed on a user computer. The input string will include one or more computer-readable characters. For example, the input string may be an email address. This input string will serve as a template for the REG to generate the regular expression.

When the input string is received, the REG computing device is configured to generate a regular expression composed of one or more character patterns. As used herein, a character pattern refers to an abbreviated sequence of characters that can represent a specific range of characters. For example, the character pattern [A-Z] can represent the full uppercase English alphabet (i.e., ABC . . . XYZ). Similarly, the character pattern [0-9] will represent all numerical characters 0123456789. Specific character sets may also serve as character patterns. For example, the character pattern [ABC] can represent that only those three characters ("A", "B", or "C") are usable at a particular position in the input string. As another example, the character pattern [?:\.] will represent that any of those special characters ("?", ":", "\", or ".") could be used in a particular position.

In one embodiment, the REG computing device generates one or more character patterns based on the input string. More specifically, the REG computing device generates one or more character patterns for each character in the input string. For example, an input string of just the letter "A" will result in a plurality of character patterns. One generated character pattern will be [A], representing only the letter A itself. Another generated character pattern will be [A-Z], representing the English alphabet in uppercase. Yet another generated character pattern will be [a-zA-Z], representing the English alphabet in uppercase and lowercase. Still another generated character pattern will be [\w], indicating that the letter A is an alphabetical and not a numerical or special character.

In another embodiment, the REG computing device is configured to generate character patterns for a subset of the input string. For example, where the input string is an email address, the REG computing device may determine that the characters placed before the "@" are all alphabetical characters. The length of this character subset may be fixed, or variable. Accordingly, the REG computing device is configured to present a string length selector via the user interface for the user to select a length of the character subset that should appear before the "@" in the regular expression. For example, the user may select that the length must be at least three but no more than ten characters. Accordingly, the REG computing device generates a character pattern for the character subset before the "@" of [A-Z]{3,10}. In a related embodiment, the REG computing device is configured to fix the length of the character subset based on the input string if no length is selected.

The REG computing device is configured to display the one or more character patterns that are generated. In one embodiment, more than one character pattern is generated for each position. In one embodiment, the REG computing device presents each character pattern (also referred to as a candidate character pattern) as a selectable choice via the user interface. For example, the candidate character patterns may be displayed as clickable buttons, with checkboxes or radio buttons, in a list, or the like. The user is prompted to select a candidate character pattern for each position associated with the entered input string. For example, where the input string is "abc@abc.com", the REG computing device will display a plurality of candidate character patterns for each of the characters "a", "b", "c", "@", "a", "b", "c", ".", "c", "o", and "m". Once a candidate character pattern is selected for each character position, the candidate character pattern is converted into a selected character pattern for the character position. Each selection of a character pattern is also referred to herein as an assignment input.

Based on the assignment inputs, the REG computing device is configured to assign the selected character pattern to each character from the input string. These assigned character patterns are then combined to generate the final regular expression. The generated regular expression is displayed via the user interface for review by the user.

In one embodiment, the REG computing device is also configured to resolve the character patterns to avoid duplication. In the above example using the input string "abc@abc.com," it may be that the user selects the character pattern of [A-Z] for each of the three positions before the "@." The REG computing device determines that these three selections are identical and resolves them into a single character pattern of [A-Z] for the three selections, in order to avoid duplication and confusion. Additionally, the [A-Z]

may be followed by a "+" character to indicate plurality. The REG computing device is also configured to determine whether the pattern needs consecutive text strings. If so, the REG computing device is configured to append one or more specially designated characters to the character pattern. For example, the REG computing device appends an asterisk ("*") or plus sign ('+') to the character subset.

In one embodiment, the REG computing device is also configured to enable the user to test the generated regular expression. More specifically, once the regular expression is generated and reviewed, the REG computing device prompts the user to test the regular expression by entering one or more additional input strings (also referred to herein as test input strings). When a test input string is entered, the REG computing device compares the test input string to the generated regular expression and checks for a match. If there is a match, the REG computing device display a message indicating a match and prompts the user to test any additional test input strings.

If there is not a match, the REG computing device displays a message indicating no match and prompts the user to enter more test input strings or update the generated regular expression. In other words, analyzing the test input string may reveal that the generated regular expression does not meet all or part of the user's preferences. For example, the regular expression generated earlier using the input string of "abc@abc.com" may limit itself to only three characters before the "@" character. However the user may need to use the regular expression for strings that include more than three characters before the "@". Accordingly, the user is prompted to update the generated regular expression. In one embodiment, the REG computing device presents the set of candidate character patterns for each position in the input string as described above. The user is then able to select a different candidate character pattern. In addition, the string length selector is displayed again in order for the user to adjust the length of one or more character patterns in the generated regular expression.

In addition, the REG computing device also provides the ability to test a batch of test input strings. This eliminates the need to manually input each test input string, which can be tedious and time-consuming. When the user is prompted to enter the test input string, the user is also provided with a button or other control to upload a test input file including multiple test input strings. When the test input file is uploaded, the REG computing device is configured to parse the test input file, extract each test input string included in the file, and test the extracted test input strings against the generated regular expression as described above. In one embodiment, when a test input file is used, the REG computing device displays a match/no match message via the user interface. In another embodiment, the REG computing device outputs a test output file that includes match/no match results for each test input string from the test input file.

The REG computing device is also configured to customize the generated regular expression according to additional user preferences. More specifically, the REG computing device is configured to generate regular expressions that comply with specific programming language grammars, interactive development environments, coding platforms, or the like. In one embodiment, the REG computing device presents a list of supported programming language identifiers via the user interface before, during, and/or after the regular expression is generated. The user is prompted to select a programming language with which the generated regular expression must comply. When a programming language identifier is selected, the REG computing device is configured to automatically update the generated regular expression. More specifically, the REG computing device accesses, from the memory device, one or more language files corresponding to the programming language identifier. The language files define a syntax corresponding to the programming language identifier. For example, a language file may indicate how a programming language interprets a specific character (e.g., a specific character or word may be a special operator or a reserved keyword and thus an invalid input for a regular expression or strings generated using the regular expression). The REG computing device generates the regular expression using the one or more language files, including customizing the regular expression to comply with the syntax.

The technical problems addressed by this system include at least one of: (i) inability of computer applications to generate regular expressions from input strings, (ii) inability of computer applications to test regular expressions, (iii) inability of computer applications to test a batch of input strings against a generated regular expression, and (iv) inability to customize generated regular expressions using a plurality of candidate character patterns, (v) inability of computer applications to customize regular expressions according to a specific programming language or software platform.

The methods and systems described herein may be implemented using computer programming or engineering techniques including computer software, firmware, hardware, or any combination or subset thereof, wherein the technical effects may be achieved at least by a) receiving, by the REG computing device, an input string including a plurality of characters for use in generating a regular expression, b) generating one or more character patterns for at least one character of the plurality of characters, c) displaying, for the at least one character, the one or more character patterns, d) assigning, based on an input received via a user interface, a first character pattern of the one or more character patterns to the at least one character, e) generating the regular expression using the first character pattern, and f) displaying the regular expression on the user interface.

The resulting technical benefits achieved by this system include at least one of: (i) improved ability to generate regular expressions that are tailored to a user's preferences at a granular level, (ii) fine-grained customizability of generated regular expressions based on ability to tailor the regular expression by individual character in a string, (iii) ability to customize a regular expression based on programming language or software platform, and (iv) ability to test regular expressions by entering one or more test input strings in order to conveniently generate robust regular expressions that can stand as search or input patterns for a wide range of inputs.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates an example configuration of a REG computing device 101. REG computing device 101 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on the REG computing device 101, such as UNIX, LINUX, Microsoft Windows®, etc. More specifically, the instructions may cause various data manipulations on data stored in storage device 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Processor 105 is operatively coupled to a communication interface 115 such that REG computing device 101 is capable of communicating with a remote device such as a user computer device.

Processor 105 may also be operatively coupled to a storage device 134. Storage device 134 is any computer-operated hardware suitable for storing and/or retrieving data. In some embodiments, storage device 134 is integrated in REG computing device 101. In other embodiments, storage device 134 is external to REG computing device 101. For example, REG computing device 101 may include one or more hard disk drives as storage device 134. In other embodiments, storage device 134 is external to REG computing device 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
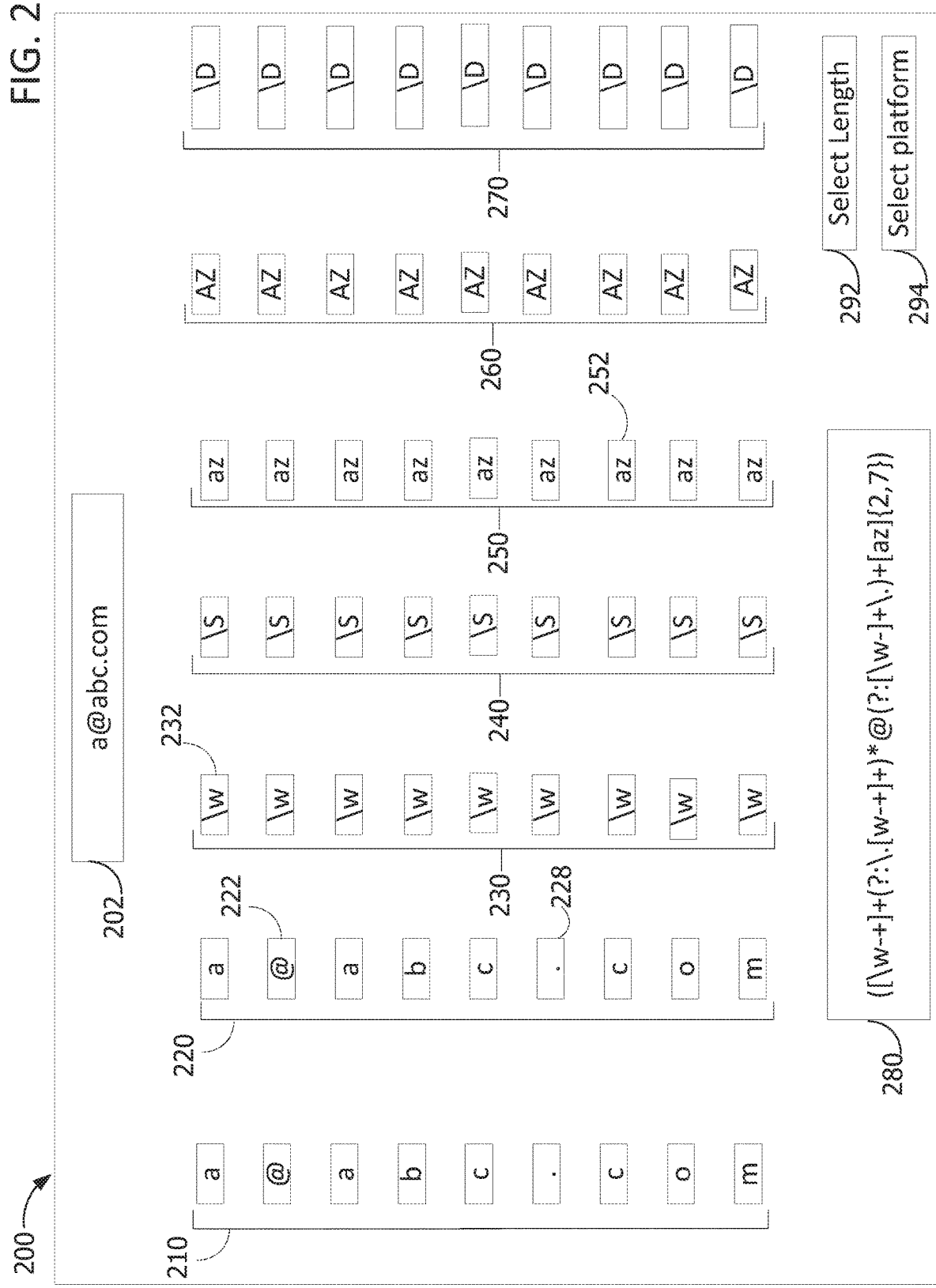

FIG. 2 shows an example user interface screen 200 which REG computing device 101 uses to receive inputs for generating regular expressions. As shown, user interface screen 200 includes an input string text box 202. As described earlier, a user will use input string text box 202 to enter an input string to use as a template for generating the regular expression. As shown in FIG. 2, a user enters "a@abc.com" into input string text box 202. In one embodiment, as the user enters the input string, each character of the input string will begin to appear on screen as input character set 210. In another embodiment, the user may activate an interactive control (not shown) on user interface screen 200, such as a button, in order to activate regular expression generation. As shown, input character set 210 displays each character of the entered input string (i.e., "a", "@", "a", "b", "c", ".", "c", "o", "m"). Additionally, user interface screen 200 shows a regular expression text box 280. Regular expression text box 280 will display the regular expression that is generated as a result of the user's selections.

As the input string is entered, REG computing device 101 is configured to also begin displaying a plurality of candidate character patterns for each character in the input string. In one embodiment, character pattern sets 220, 230, 240, 250, 260, and 270 are displayed for each character in the input string. In other embodiments, various other character patterns may be displayed for selection. Additionally, each of character pattern sets 220, 230, 240, 250, 260, and 270 may also be referred to as sets of candidate character patterns, to be selected based on user preference.

In one embodiment, character pattern set 220 represents the specific entered character only. For example, for the entered character "a", a selection from character pattern 220 will be the character "a" itself. For the "@" character, a selection from character pattern set 220 will be the "@" character itself, and so on. By contrast, character pattern set 230 represents word characters only (and not numerical or special characters). Character pattern set 240 represents special characters only. Character pattern set 250 represents lowercase letters only. Character pattern set 260 represents uppercase letters only. Character pattern set 270 represents numbers (digits) only.

In one embodiment, each of the character patterns of character pattern sets 220, 230, 240, 250, 260, and 270 are represented as selectable interactive controls on user interface screen 200. The user will select the interactive control corresponding to the desired character pattern. For example, for the first character in the input string (i.e., "a"), the user selects "\w" by selecting the interactive control corresponding to character pattern 232. When the user makes this selection, REG computing device 101 is configured to assign "\w" as the character pattern for the first character in the input string. Additionally, REG computing device 101 updates regular expression text box 280 with the assignment. For example, regular expression text box 280 shows "\w" as the first entry once the user selects it.

Similarly, the user selects character pattern 222 ("@") from character pattern set 220 to denote that the @ character itself must be included after the word character (e.g., for the example of an email address). Additionally, the user may continue to select other character patterns, including character pattern 228 and character pattern 252 from character pattern sets 220 and 250 respectively. As described above with respect to character pattern 232, REG computing device 101 enters the selections of character patterns 222, 228, and 252 into regular expression text box 280 and dynamically generates the regular expression as selections are made.

The user is prompted to continue selecting a character pattern for each position in the input string. In one embodiment, if a selection is not made, the particular character position is highlighted and a message (not shown) is displayed. In one embodiment, REG computing device 101 will default to using the entered character as a default selection for its character position. In other words, REG computing device 101 will use character pattern 220 for that position and update regular expression text box 280 accordingly. In another embodiment, the regular expression generated in regular expression text box 280 is marked incomplete until a selection is made. In yet another embodiment, there is a default selection of a different character pattern. In still another embodiment, the regular expression is generated with no input for that character position.

In one embodiment, REG computing device 101 is configured to concatenate each selected character pattern into a final regular expression that is displayed in regular expression text box 280. In another embodiment, REG computing device 101 does not merely display the concatenated character patterns but performs additional helper functions as well to improve readability and usability of the regular expression. For example, where two consecutive "\w" patterns are selected, the REG computing device 101 is configured to resolve these into a single "\w" when displaying in regular expression text box 280. In addition, REG computing device 101 is configured to add a "+" or other character after the single "\w" in order to indicate that more than one word character is part of the regular expression. Additionally, REG computing device 101 is configured to add organizational characters (such as parentheses) to clearly set off parts of the regular expression. Certain characters may be escaped to avoid confusion between, for example, an opening parenthesis "(" and an opening parenthesis used to group character patterns for readability. Various escape characters can be used. For example, a combination of '\' and another escaped character may be used. In the exemplary embodiment, the '*' indicates zero or more occurrences of a character subset.

Additionally, user interface screen 200 includes a length selector control 292 and a platform selector control 294. In the exemplary embodiment, these two controls may represent single selection functions or multiple selection functions. For example, length selector control 292 may be used to control the length of the whole generated regular expression. However, length selector control 292 can also be used to control the length of a subset of the regular expression. For example, the entered input string includes a top level domain (TLD) identifier (i.e., the ".com"). Length selector control 292 can be used to control the length of just the TLD identifier. Using length selector control 292, the user may adjust the regular expression to encompass other TLD identifiers such as ".co.uk", ".ccc", ".chrome", and the like. In one embodiment, length selections are appended to the regular expression in curly braces. In regular expression text box 280, these appear at the end as "{2, 7}". The "{2, 7}" is placed within parentheses after the "@" along with word characters and after a period "." to indicate that the length selection pertains to the TLD identifier only. REG computing device 101 allows the user to select the length of the TLD identifier with additional text such as "{m, n}" after the TLD character subset. Here m and n are numbers that provide the range (i.e., length of the TLD to be selected). Accordingly, the whole regular expression will have its own length indicator with a wrapper wrapping the whole regular expression, as distinct from the "{m, n}" used for just the TLD identifier.

Platform selector control 294 is used to select a programming language, coding platform, or other environment with which the regular expression must comply. In one embodiment, activating platform selector control 294 causes display of a list (not shown) of various programming languages and platforms for user selection. When a selection is received, REG computing device 101 is configured to update the generated regular expression in regular expression text box 280 to reflect compliance with the selected programming language or platform. For example, where the regular expression included a character or character sequence that would cause errors if used in the selected programming language, REG computing device 101 is configured to display a message indicating this and prompting the user to select a different character pattern.

Figure 3:
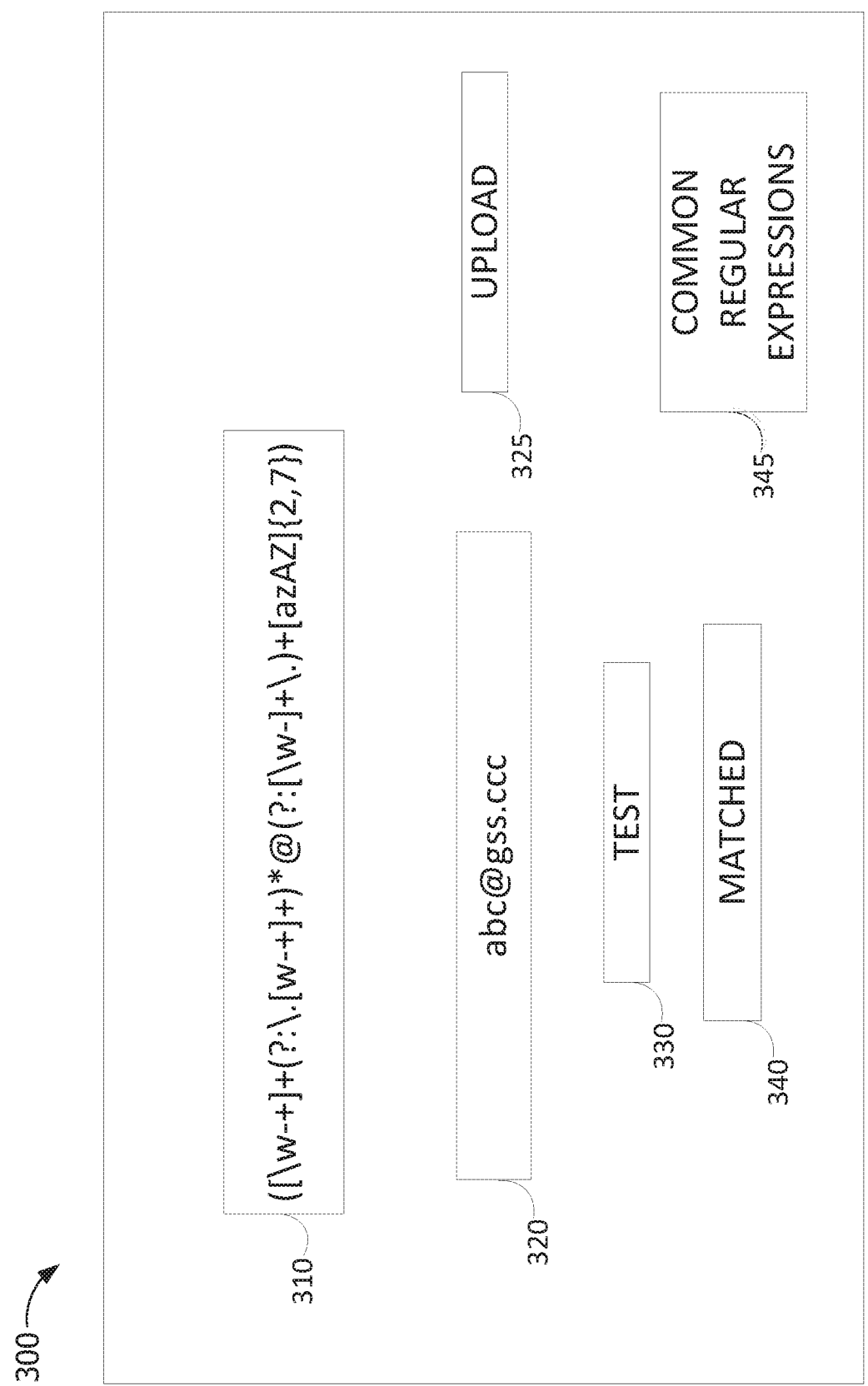

FIG. 3 shows a user interface screen 300 which REG computing device 101 uses to prompt the user to test generated regular expressions. As shown in FIG. 3, regular expression text box 310 (similar to regular expression text box 280 as shown in FIG. 2) displays a recently generated regular expression. In one embodiment, regular expression text box 310 is editable such that a user can edit the regular expression in the course of testing it. User interface screen 300 also shows an input string text box 320, which is used to enter test input strings to be compared against the generated regular expression. User interface screen 300 also shows an upload button 325, a test button 330, a message box 340, a common regular expressions button 345.

In the example embodiment, REG computing device 101 pre-populates regular expression text box 310 with the most recently generated regular expression and prompts the user to test the regular expression using a test input string. The user enters the test input string in input string text box 320 and selects test button 330. Alternatively, the user can upload a file including one or more test input strings using upload button 325. Based on these inputs, REG computing device 101 compares the regular expression in regular expression text box 310 with the input string entered in input string text box 320. If the test input string complies with the pattern represented by the generated regular expression, REG computing device 101 is configured to display a message in message box 340 indicating a match. If the test input string does not comply with the generated regular expression, REG computing device 101 is configured to display a message in message box 340 indicating that there was no match. In the event of a failed match, REG computing device 101 additionally prompts the user to enter a different test input string or update the generated regular expression and test again.

In addition, the user can select the common regular expressions button 345 to view a list of common regular expressions (not shown). These common regular expressions will match with commonly used input strings (e.g., certain email address formats, telephone number formats, password formats, or the like) and be labeled for convenient selection. In one embodiment, REG computing device 101 prompts the user to select a common regular expression from the list. Based on the selection, REG computing device 101 populates regular expression text box 310 and prompts the user to enter test input strings to be compared against the common regular expression.

Figure 4:
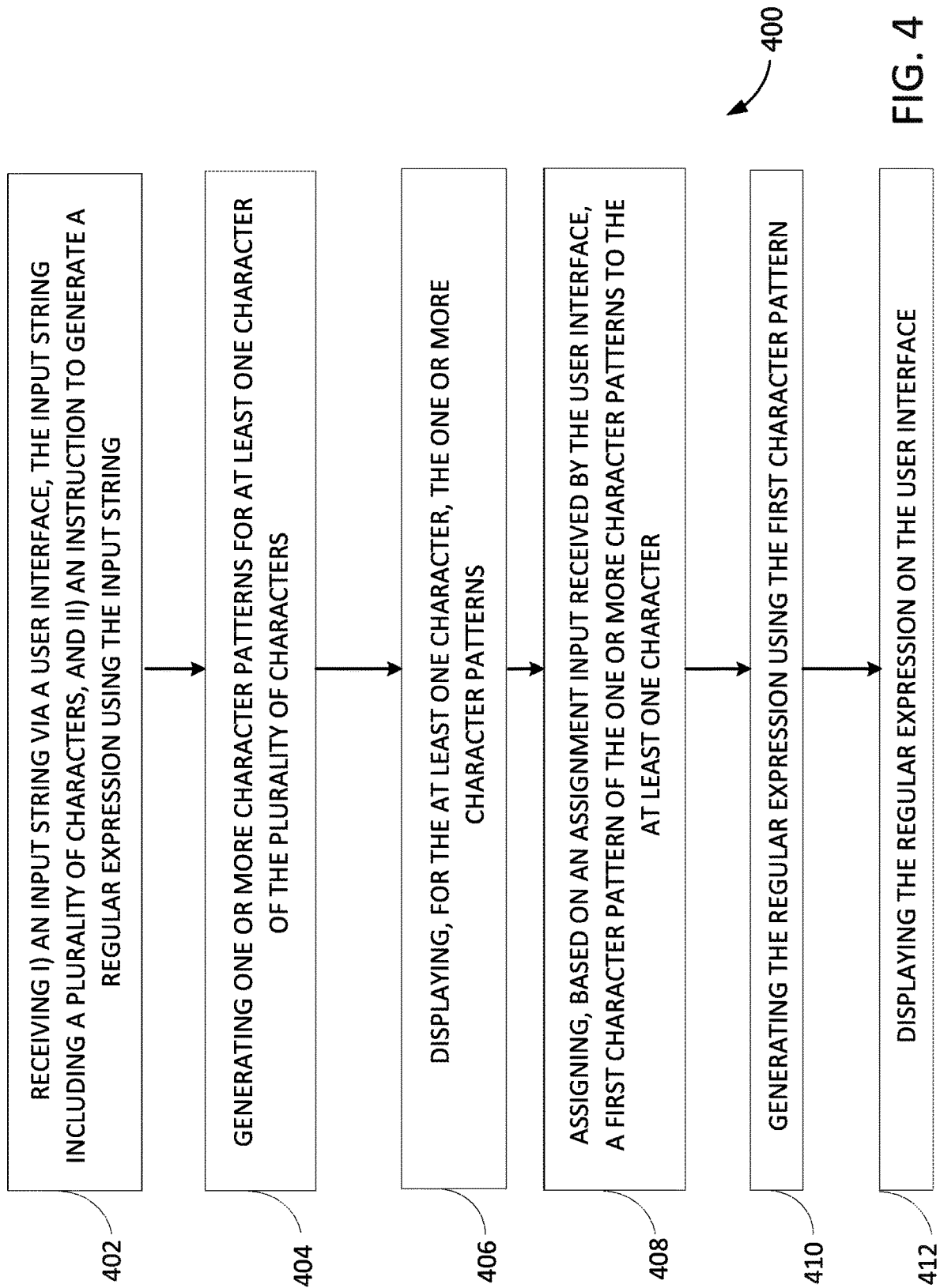

FIG. 4 shows an example method flow 400 illustrating how the REG computing device generates customizable regular expressions. In the example embodiment, REG computing device 101 (shown in FIG. 1) is configured to receive 402 an input string via a user interface. The input string includes one or more characters. Additionally, REG computing device 101 is configured to receive an instruction to generate a regular expression using the input string. Upon receiving the input string, REG computing device 101 is configured to generate 404 one or more character patterns for at least one character of the characters in the input string. Character patterns, as described above, may include "\w" for word characters, "\D" for digits, and the like.

In one embodiment, more than one character pattern will be generated for each character in the input string. REG computing device 101 is configured to display 406, for the at least one character, the one or more character patterns on the user interface. As described above with respect to FIG. 2, the character patterns are displayed in order to correspond to each character in the input string. The user is prompted to select a character pattern for each character in the input string. These selections are also referred to herein as assignment inputs. REG computing device 101 is configured to assign 408, based on the assignment inputs, a first character pattern of the one or more character patterns to the at least one character. REG computing device 101 continues to assign character patterns until the whole input string has been assigned one or more character patterns.

REG computing device 101 is configured to generate 410 the regular expression using the assigned character patterns. In one embodiment, REG computing device 101 concatenates or combines the assigned character patterns into a single regular expression. Once the regular expression is completed, REG computing device 101 is configured to display 412 the regular expression on the user interface.

Figure 5:
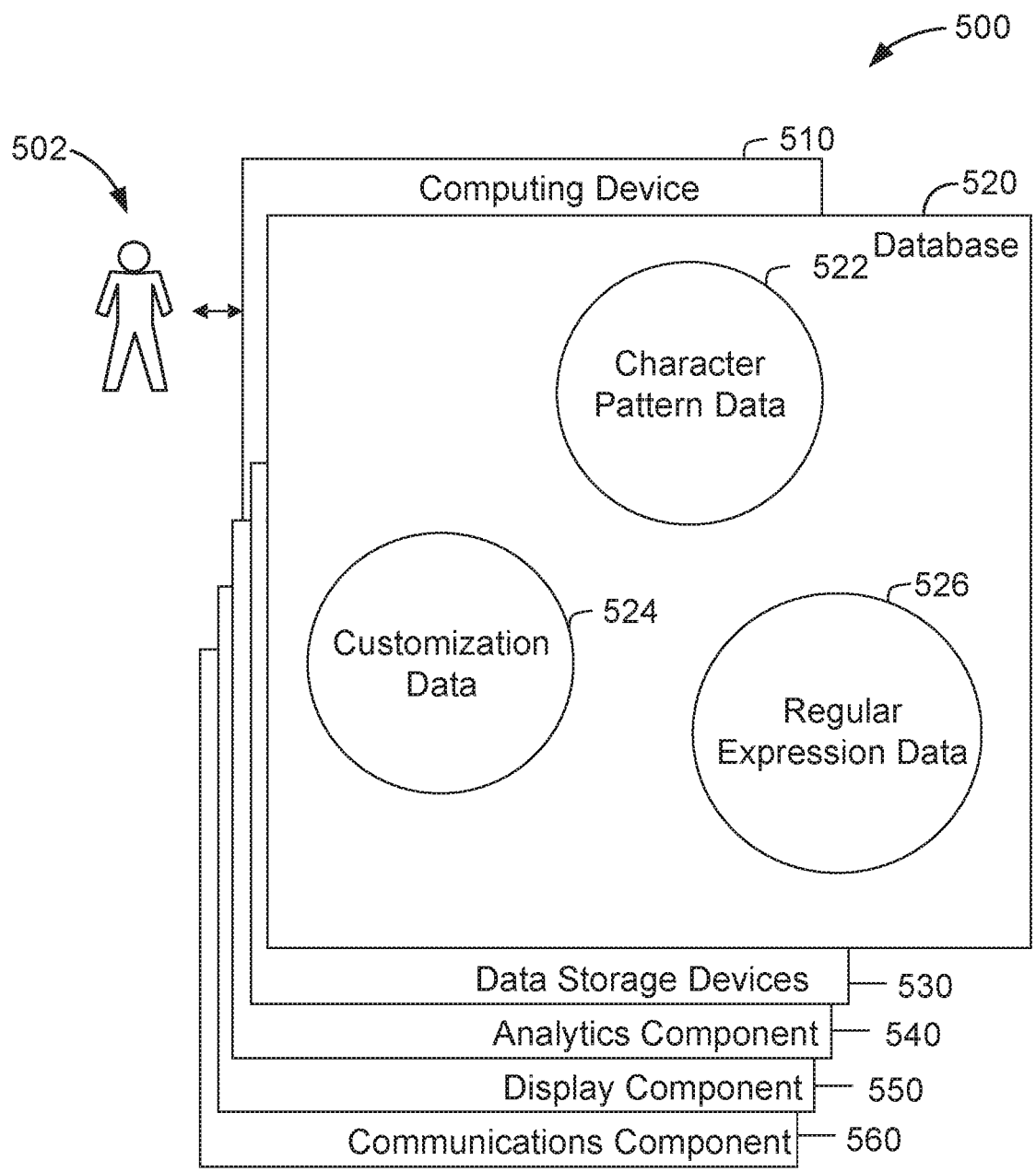

FIG. 5 shows an example configuration of a database 500 within a computer device, along with other related computer components, that may be used to generate customizable regular expressions. In some embodiments, computer device 510 is similar to REG computing device 101 (shown in FIG. 1). User 502 (such as a user operating REG computing device 101) may access computer device 510 in order to generate regular expressions using an input string. In some embodiments, database 520 is similar to storage device 134 (shown in FIG. 1). In the example embodiment, database 520 includes character pattern data 522, customization data 524, and regular expression data 526. Character pattern data 522 includes data regarding character patterns that REG computing device 101 has the ability to generate and assign to characters in the entered input string. Customization data 524 includes details of various customizations that users can apply to generated regular expressions. These include the ability to customize the regular expression based on size, programming language or platform to be used, or the like.

Regular expression data 526 includes data relating to generated regular expressions as well as common regular expressions. In one embodiment, REG computing device 101 is configured to store generated regular expressions and track a history of changes to these generated regular expressions in order to determine user preferences and learn how to generate more usable regular expressions over time. REG computing device 101 is configured to store common regular expressions that correspond to common text patterns (e.g., email, telephone number, country codes, common username styles) and the like.

Computer device 510 also includes data storage devices 530. Computer device 510 also includes analytics component 540 that assists in generating regular expressions. Computer device 510 also includes display component 550 that can be used by user 502 to view generated regular expressions and character patterns. Computer device 510 also includes communications component 560 which is used to communicate with remote computer devices (e.g., a user computing device). In one embodiment, communications component 560 is similar to communications interface driver 115 (shown in FIG. 1).

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A regular expression generator (REG) computing device for generating customized regular expressions readable by a computing device, the REG computing device including a processor, a display device, and a memory device, the REG computing device configured to:
    receive an input string including a plurality of characters for use in generating a regular expression;
    display the input string as a first array of character positions on the display device, wherein each character position of the first array is associated with a single character of the plurality of characters;
    for each character position of the first array of character positions, generate one or more character patterns for the single character associated with the character position;
    for each character position of the first array of character positions, display the one or more character patterns as an array of pattern options, wherein the array of pattern options is oriented on the display device to be aligned with the associated character position;
    prompt the user to make a selection for one or more of the character positions of the first array of character positions;
    assign a respective default character pattern of the one or more character patterns to each character position of the first array of character positions, each respective default value based on a value of the corresponding position of the input string;
    generate, and display on the display device, a regular expression using the respective default character pattern for each character position of the first array of character positions;
    receive, via a user interface after displaying the regular expression generated using the respective default character pattern for each character position, a series of inputs, each input of the series of inputs designating a respective user-chosen character pattern of the one or more character patterns for a corresponding character position of the first array;
    dynamically update, in response to each input of the series of inputs, the regular expression displayed on the display device by substituting the respective user-chosen character pattern for the respective default character pattern;
    highlight, in response to at least one instance of said dynamic update, one or more character positions of the first array of character positions for which the user has made no selection;
    after receiving the series of inputs, re-generate the regular expression by automatically resolving consecutive duplicate instances of at least one of the one or more character patterns in the regular pattern into a single instance of the at least one character pattern and a special plurality character; and
    display the re-generated regular expression on the display device.

2. A device in accordance with claim 1, further configured to:
    receive at least one test input string that corresponds to a user preference;
    validate the regular expression using the test input string, including comparing the first character pattern to at least one test input character from the test input string; and
    display a regular expression validation message on the user interface.

3. A device in accordance with claim 1, wherein dynamically updating the regular expression further includes concatenating each respective user-chosen character pattern and each respective default character pattern based on an order of each associated character position within the first array of character positions.

4. A device in accordance with claim 1, wherein a first character pattern of the one or more character patterns includes one or more of an alphabetical character pattern, a numerical character pattern, and a special character pattern.

5. A device in accordance with claim 1, further configured to:
    receive a parameter input for the regular expression via the user interface, wherein the parameter input includes one or more of a minimum length parameter, a maximum length parameter, and a regular expression type parameter, and wherein the regular expression type parameter corresponds to a type of the regular expression to be generated.

6. A device in accordance with claim 1, further configured to:
    receive a language parameter input via the user interface, wherein the language parameter input includes a programming language identifier;
    access, from the memory device, one or more language files corresponding to the programming language identifier, wherein the one or more language files define a syntax corresponding to the programming language identifier; and
    wherein dynamically updating the regular expression comprises using the one or more language files, including customizing the regular expression to comply with the syntax.

7. A computer-implemented method for generating customized regular expressions readable by a computing device, the method implemented using a regular expression generator (REG) computing device including a processor, a display device, and a memory device, the method comprising:
    receiving, by the REG computing device, an input string including a plurality of characters for use in generating a regular expression;
    displaying the input string as a first array of character positions on the display device, wherein each character position of the first array is associated with a single character of the plurality of characters;
    for each character position of the first array of character positions, generating one or more character patterns for the single character associated with the character position;
    for each character position of the first array of character positions, displaying the one or more character patterns as an array of pattern options, wherein the array of pattern options is oriented on the display device to be aligned with the associated character position;

prompting the user to make a selection for one or more of the character positions of the first array of character positions;

assigning a respective default character pattern of the one or more character patterns to each character position of the first array of character positions, each respective default value based on a value of the corresponding position of the input string;

generating, and displaying on the display device, a regular expression using the respective default character pattern for each character position of the first array of character positions;

receiving, via a user interface after displaying the regular expression generated using the respective default character pattern for each character position, a series of inputs, each input of the series of inputs designating a respective user-chosen character pattern of the one or more character patterns for a corresponding character position of the first array;

dynamically updating, in response to each input of the series of inputs, the regular expression displayed on the display device by substituting the respective user-chosen character pattern for the respective default character pattern;

highlighting, in response to at least one instance of said dynamic update, one or more character positions of the first array of character positions for which the user has made no selection;

after receiving the series of inputs, re-generating the regular expression by automatically resolving consecutive duplicate instances of at least one of the one or more character patterns in the regular pattern into a single instance of the at least one character pattern and a special plurality character; and displaying the re-generated regular expression on the display device.

8. A method in accordance with claim 7, further comprising:

receiving at least one test input string that corresponds to a user preference;

validating the regular expression using the test input string, including comparing the first character pattern to at least one test input character from the test input string; and displaying a regular expression validation message on the user interface.

9. A method in accordance with claim 8, wherein dynamically updating the regular expression further includes concatenating each respective user-chosen character pattern and each respective default character pattern based on an order of each associated character position within the first array of character positions.

10. A method in accordance with claim 7, wherein a first character pattern of the one or more character patterns includes one or more of an alphabetical character pattern, a numerical character pattern, and a special character pattern.

11. A method in accordance with claim 7, further comprising:

receiving a parameter input for the regular expression via the user interface, wherein the parameter input includes one or more of a minimum length parameter, a maximum length parameter, and a regular expression type parameter, and wherein the regular expression type parameter corresponds to a type of the regular expression to be generated.

12. A method in accordance with claim 7, further comprising:

receiving a language parameter input via the user interface, wherein the language parameter input includes a programming language identifier;

accessing, from the memory device, one or more language files corresponding to the programming language identifier, wherein the one or more language files define a syntax corresponding to the programming language identifier; and wherein dynamically updating the regular expression comprises using the one or more language files, including customizing the regular expression to comply with the syntax.

13. A non-transitory computer readable medium that includes computer executable instructions for generating customized regular expressions readable by a computing device, wherein when executed by a regular expression generator (REG) computing device including a processor, a display device, and a memory device, the computer executable instructions cause the REG computing device to:

receive an input string including a plurality of characters for use in generating a regular expression;

display the input string as a first array of character positions on the display device, wherein each character position of the first array is associated with a single character of the plurality of characters;

for each character position of the first array of character positions, generate one or more character patterns for the single character associated with the character position;

for each character position of the first array of character positions, display the one or more character patterns as an array of pattern options, wherein the array of pattern options is oriented on the display device to be aligned with the associated character position;

prompt the user to make a selection for one or more of the character positions of the first array of character positions;

assign a respective default character pattern of the one or more character patterns to each character position of the first array of character positions, each respective default value based on a value of the corresponding position of the input string;

generate, and display on the display device, a regular expression using the respective default character pattern for each character position of the first array of character positions;

receive, via a user interface after displaying the regular expression generated using the respective default character pattern for each character position, a series of inputs, each input of the series of inputs designating a respective user-chosen character pattern of the one or more character patterns for a corresponding character position of the first array;

dynamically update, in response to each input of the series of inputs, the regular expression displayed on the display device by substituting the respective user-chosen character pattern for the respective default character pattern;

highlight, in response to at least one instance of said dynamic update, one or more character positions of the first array of character positions for which the user has made no selection;

after receiving the series of inputs, re-generate the regular expression by automatically resolving consecutive duplicate instances of at least one of the one or more character patterns in the regular pattern into a single instance of the at least one character pattern and a special plurality character; and display the re-generated regular expression on the display device.

14. A non-transitory computer readable medium in accordance with claim 13, wherein the computer-executable instructions further cause the REG computing device to:

receive at least one test input string that corresponds to a user preference;

validate the regular expression using the test input string, including comparing the first character pattern to at least one test input character from the test input string; and display a regular expression validation message on the user interface.

15. A non-transitory computer readable medium in accordance with claim 13, wherein dynamically updating the regular expression further includes concatenating each user-chosen character pattern based on an order of each associated character position within the first array of character positions.

16. A non-transitory computer readable medium in accordance with claim 13, wherein the computer-executable instructions further cause the REG computing device to:

receive a parameter input for the regular expression via the user interface, wherein the parameter input includes one or more of a minimum length parameter, a maximum length parameter, and a regular expression type parameter, and wherein the regular expression type parameter corresponds to a type of the regular expression to be generated.

17. A non-transitory computer readable medium in accordance with claim 13, wherein the computer-executable instructions further cause the REG computing device to:

receive a language parameter input via the user interface, wherein the language parameter input includes a programming language identifier;

access, from the memory device, one or more language files corresponding to the programming language identifier, wherein the one or more language files define a syntax corresponding to the programming language identifier; and wherein dynamically updating the regular expression comprises using the one or more language files, including customizing the regular expression to comply with the syntax.

* * * * *